United States Patent
Kikugawa

(10) Patent No.: US 8,089,845 B2
(45) Date of Patent: Jan. 3, 2012

(54) OFFSET COMPENSATOR AND OPTICAL DISC DRIVE USING THE SAME

(75) Inventor: Atsushi Kikugawa, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 646 days.

(21) Appl. No.: 12/271,093

(22) Filed: Nov. 14, 2008

(65) Prior Publication Data

US 2009/0135699 A1 May 28, 2009

(30) Foreign Application Priority Data

Nov. 15, 2007 (JP) ................................ 2007-296768

(51) Int. Cl.
*G11B 7/00* (2006.01)

(52) U.S. Cl. ................. 369/59.19; 369/59.21; 369/47.35

(58) Field of Classification Search ................. 369/59.1, 369/59.11, 59.12, 59.19, 59.2, 59.21, 59.34, 369/59.33, 47.35
See application file for complete search history.

(56) References Cited

U.S. PATENT DOCUMENTS

| | | | | |
|---|---|---|---|---|
| 5,278,815 A * | 1/1994 | Mashimo et al. | .......... | 369/47.21 |
| 5,757,751 A * | 5/1998 | Chapman | .................. | 369/53.33 |
| 6,359,846 B1 * | 3/2002 | Shoji et al. | .................. | 369/47.5 |
| 6,493,163 B1 * | 12/2002 | Reed et al. | ...................... | 360/51 |
| 7,315,497 B2 * | 1/2008 | Minamino et al. | ......... | 369/47.22 |
| 7,483,478 B2 * | 1/2009 | Kikugawa et al. | ............ | 375/229 |
| 7,567,491 B1 * | 7/2009 | Oberg et al. | ................ | 369/59.21 |
| 7,738,332 B2 * | 6/2010 | Minemura | .................. | 369/53.11 |
| 2006/0280240 A1 | 12/2006 | Kikugawa et al. | | |
| 2007/0140074 A1 * | 6/2007 | Nunez et al. | ................ | 369/44.13 |
| 2007/0297248 A1 * | 12/2007 | Hidaka | ..................... | 365/189.05 |
| 2008/0130442 A1 | 6/2008 | Kikugawa et al. | | |

FOREIGN PATENT DOCUMENTS

| | | |
|---|---|---|
| JP | 11-296987 | 10/1999 |
| JP | 2006-4465 | 1/2006 |
| JP | 2006-344294 | 12/2006 |
| JP | 2008-140525 | 6/2008 |

* cited by examiner

*Primary Examiner* — Wayne Young
*Assistant Examiner* — Thomas Alunkal
(74) *Attorney, Agent, or Firm* — Mattingly & Malur, PC

(57) ABSTRACT

The generation of a pseudo-lock is prevented in a JFB offset compensator whose use has been conventionally limited due to a tendency to generate the pseudo-lock, and performance degradation of a PLL and a Viterbi decoder is suppressed. A means for monitoring an offset of a read signal is provided independently from the JFB offset compensator. With this configuration, the generation or a possibility of the generation of the pseudo-lock can be detected to reset an integrator. In order to reduce the influence of a large sporadic offset triggering the pseudo-lock, there may also be provided a limitter for limiting the absolute value of an offset signal inputted to the integrator or a limitter for limiting the absolute value of an offset compensation signal.

8 Claims, 15 Drawing Sheets

US 8,089,845 B2

OFFSET COMPENSATOR AND OPTICAL DISC DRIVE USING THE SAME

CLAIM OF PRIORITY

The present application claims priority from Japanese patent application JP 2007-296768 filed on Nov. 15, 2007, the content of which is hereby incorporated by reference into this application.

BACKGROUND OF THE INVENTION

1. Field of the Invention

The present invention relates to a read signal processing system for an optical disc drive.

2. Description of the Related Art

The application range of the present invention is not limited to Blu-ray Discs (hereinafter referred to as "BDs"), but the description below is based on a BD and terms are basically those used for BDs.

As of 2007, a BD is a commercially available optical disc with the largest capacity among those in practical use. The surface recording capacity of an optical disc is primarily limited by the size of an optical spot on a recording layer used for recording and reproduction. The size of the optical spot is mainly determined by the wavelength of light and the numerical aperture (NA) of an objective lens. In BDs, the large capacity is achieved by use of light having a wavelength of 405 nm and an objective lens having a numerical aperture of 0.85. As a result, there has been developed a BD having a recoding capacity of 50 GB with two recording layers, that is, 25 GB per recording layer. It is understood by those skilled in the art that it is difficult to further shorten the wavelength of light or to further increase the numerical aperture of an objective lens to the extent of bringing significant increase in the recording capacity.

Due to the reason described above, providing multiple recording layers is highly expected as an effective means for increasing the capacity further on. However, providing multiple layers also has problems, and the main ones are interlayer interference and decrease in amount of reproduction light. Thus, simply increasing the number of recording layers is not necessarily practical, and it is necessary to increase the linear recording density simultaneously.

When the linear recording density is increased, inter-symbol interaction strongly works, thereby significantly influencing the shortest mark and space (of 2T where T represents a channel clock period) in particular. For example, in the case where the channel bit length is shortened to 55.9 nm (corresponding to a surface recording capacity of 33.3 GB), the length of the shortest mark and space is less than the optical resolution of a BD optical system. In other words, the resolution is zero. Even in such a situation, it is possible to ensure a decoding performance by using Viterbi decoding. The Viterbi decoding is performed on the assumption that a channel clock is synchronized with a read signal with sufficient accuracy. However, the zero resolution for the shortest mark and space also produces a concomitant problem. Specifically, such zero resolution adversely affects the operation of a phase locked loop (PLL) which generates a channel clock from the read signal.

FIG. 2 shows a configuration example of a very primitive signal processing system for decoding. This specification is based on a Viterbi decoding system in which an analog read signal is subjected to an analog-to-digital (AD) conversion and then to a signal processing. Thus, in this specification, a read signal is mainly used to refer to a digital signal after the AD conversion. However, since those skilled in the art would not confuse an analog signal before the AD conversion with a digital signal, both are simply called read signals for simplicity in the case where it is clear from the context.

An analog read signal is equalized by an analog equalizer 1, and then converted to a digital signal by an AD converter 2. The timing of a sampling at this time is determined by a channel clock. Then, a phase detector 6 compares the phase of the resultant read signal with the phase of the channel clock. A phase error signal is smoothed by a loop filter 9, and is converted to an analog signal by a DA converter 11. Then, the voltage of the resultant signal is inputted as a control signal to a voltage controlled oscillator (VCO) 10. The VCO 10 oscillates at a frequency instructed by the inputted voltage of the control signal to output a signal, and the outputted signal is used as a channel clock. In other words, the outputted signal is used as a driving clock of various components including the AD converter 2, the phase detector 6, the loop filter 9, the DA converter 11, and a Viterbi decoder 7. The fact that this closed loop constitutes a PLL which functions to synchronize the channel clock with the clock of a read signal and detailed operations thereof are known to those skilled in the art, and therefore will not be described in detail. Also, the details of the operation of a Viterbi decoder are not directly associated with the present invention, and therefore the description thereof will be omitted.

FIG. 3 is a view illustrating the principle of a phase comparison. The phase comparison is performed using an edge (portion where the read signal intersects with a zero level), i.e., a point corresponding to the boundary of the mark and space. The channel clock is synchronous with the edge. Meanwhile, the timing of the AD conversion is shifted by T/2 (where T represents the channel clock period) from a clock timing with the edge as the reference. Hereinafter, for simplification, a read signal sampled T/2 before a channel clock time nT (where n represents an integer) is shown as x(n). In FIG. 3, the edge and sample points in the case where the phases of the channel clock and the edge are completely synchronous are shown by a dotted line and outline circles. The edge is at the time nT. The values of the two sample points sandwiching the edge at this time are respectively shown as x(n+1) and x(n). The read signal in the vicinity of the edge is assumed to be linear. At this time, x(n)=−x(n+1) is satisfied. On the other hand, the case where the phase of the same edge is delayed by ΔT from the phase of the channel clock is shown by a solid line and black circles. Here, it is assumed that the edge is between the channel clock times (n+1)T and nT, and that the values of respective sample points are shown as x(n+1) and x(n). Clearly, x(n)≠−x(n+1) is true. Assuming the linearity of the edge, these sample points apparently has a relation shown by formula (1):

$$\Delta T \propto x(n) + x(n+1) \tag{1}$$

Specifically, by sampling the read signal with the channel clock and determining the edge, a phase error can be detected from the difference in the read signal level between two sample points sandwiching the edge.

In the case of obtaining the phase error from the level of the signal in this manner, an accurate phase error cannot be obtained when a unwanted DC component is superimposed on the read signal. This will be described using FIG. 4. The edge and sample points in the case where the read signal includes no unwanted DC component and where the phases of the channel clock and the read signal are completely synchronous with each other are shown by a dotted line and outline circles. On the other hand, the edge and sample points in a state where the DC component of Δx is superimposed while the phases of the read signal and the channel clock are synchronous with each other are shown by a solid line and black circles. Even in a state where the read signal and the channel clock are synchronous with each other, a wrong phase error value is outputted when the phase comparison is performed as defined by the formula (1) if the DC component is superimposed. Thus, the DC component of the read signal is removed using a high-pass filter before the input of the read signal to the phase detector. However, even in this state, a DC component variation or the like dependent on a pattern remains in the read signal.

In a partial response most-likely (PRML) decoding method, read signals at consecutive times are decoded into a most-likely bit string by comparing the read signals with target signals. A Viterbi decoding method as one of the most-likely (ML) decoding methods is widely in practical use since the circuit scale can significantly be reduced. In order to cope with the increase in speed and capacity, the PRML method is increasingly applied as a reproduction means for optical discs. Since it is assumed that the target signals have no unnecessary DC components, the decoding performance is reduced when the read signals having DC components superimposed thereon are compared with the target signals.

As described above, when a DC offset is applied to the read signal, the reproduction performance is deteriorated. Thus, high-pass filters, DFB, and JFB have been used as a means for removing the DC offset from the read signal.

The high-pass filter cuts the DC components in average of a sufficiently long period of time, in the case where the signal has no asymmetry. However, local DC component variations dependent on a recording pattern remains. Meanwhile, in the case where the signal has an asymmetry, the DC offset occurs due to the influence thereof. As a means for removing such DC offsets, there is a duty feedback (DFB) slicer. The DFB slicer uses the fact that bit strings recorded on an optical disc are modulated using a modulation code that provides the bit strings with the equal appearance probabilities of "0" and "1" in the integration of the bit strings in a certain or longer period.

One example of the configuration of the DFB slicer is shown in FIG. 5. A read signal is digitized by the AD converter 2, and then an offset compensation signal detected by a means to be described later is subtracted using a subtractor 3. In the notation of the drawing, a "−" mark is assigned to a subtracting side of the signal, and a "+" mark is assigned to a subtracted side of the signal. This notation is applied throughout this specification. First, the read signal passes through a limiter 4. As shown in FIG. 6, the limiter 4 clips the read signal at a value (limit level) designated in advance. This signal is called a limit signal. As described above, the appearance probabilities of "0" (in which the limit signal is negative) and "1" (in which the limit signal is positive) are equal, whereby the value obtained by integrating the limit signal by an integrator is an offset component of the read signal. In other words, if the offset is zero, the result of the integration is zero. In contrast, in the case where a positive offset supposedly exists in the read signal, the positive period of the limit signal increases, whereby the integration result becomes a positive value. Thus, the offset can be removed by subtracting the integration result from the read signal. Since a feedback loop is formed in reality, an appropriate loop gain in consideration of the stability and response speed of the loop is multiplied before the subtraction.

By setting the limit level to be sufficiently smaller than the read signal amplitude, the integration result of the limit signal becomes dependent only on the time proportion of the positive and negative of the read signal. Accordingly, even in the case where the read signal has an asymmetry, the offset can be removed without almost any influence thereof.

As can be seen from the above, a condition for the DFB slicer to operate normally is that the sign of the read signal can be determined with an accuracy of a certain degree. In the case where the resolution of the shortest mark and space has become zero by the increase in the linear recording density, the signal level of them is almost brought to zero level. However, in reality, the values of the signals unstably vary slightly to the positive or negative due to the influence of the inter-symbol interaction or the like. Thus, the determination accuracy of the positive or negative of the read signal by the DFB slicer decreases. In the case where there is no asymmetry in the read signal, there is no obvious trouble. However, in the case where there is a large asymmetry in the read signal, the result may be highly erroneous. One example is shown in FIG. 7.

The channel bit length at this time is 55.9 nm, and the asymmetry is 15%. In FIG. 7, a dotted curved line shows the read signal, and a solid line shows the phase error signal. Even though the PLL is in a locked state, a large phase error is detected at each edge. The signs are opposite at edges on the right and left of the same space or mark. This is because there is an offset in the read signal. Specifically, when there is a constant offset, the edges on the right and left has the opposite signs according to the definition of the phase error since the middle point of the edge does not coincide with the zero level, and the two edges on the left and right of the mark or space are offset in the same direction. In this manner, an average phase error increases when a large phase error constantly continues to be detected in the PLL loop, thereby leading to an increase in jitter of the channel clock or instability of the loop.

Phenomena which the DFB slicer has a difficulty to cope with other than those described above include the inter-layer interference of a dual-layered disc which attributes to the disc structure whereby the reproduction performance is deteriorated in an extremely wide range on the disc. FIG. 8 shows an example of the read signal disturbed by the inter-layer interference. This is an example of a case where a layer L1 of a rewritable dual-layered BD disc, i.e., a layer on the side closer to the surface, is reproduced. It can be seen that the upper and lower envelopes which are originally supposed to be flat are both largely disturbed externally by the inter-layer interference. When the layer L1 is reproduced, reproduction light is focused on the layer. A part of the reproduction light transmits through the layer L1, is reflected by a layer L0, and partly reaches a photodetector of an optical head. Since light from the two layers L0 and L1 simultaneously reaches the photodetector, interference by both lights occurs. The interval between the layer L0 and the layer L1 generally slightly differs depending on position on the disc. The interference pattern on the photodetector due to the light from the two layers L0 and L1 changes with time when the disc is reproduced in such a situation. As a result, the disturbance of the read signal occurs as shown in FIG. 8. When the signal is disturbed as shown in the drawing, the signal recorded in that portion cannot be decoded correctly, whereby a burst error occurs in the same manner as in the case of a defect. In the example shown in FIG. 8, the burst error has a length of several hundred bytes. This is a length which is completely harmless in the reproduction considering the capability of an error correction code of a Blu-ray Disc system. However, in the case of reproducing a region in which the change in the layer interval is large in the tangential direction of the disc, the situation of the interference on the photodetector changes more drastically. Thereby, the disturbance of the signal as shown in the drawing appears more frequently, i.e., appears multiple times within one recording unit block (RUB). In such a situation, the probability of a read error becomes significant. Note that, factors causing the read signal disturbances in the same manner include fingerprints and track deviation.

As a means for removing the offset of the read signal other than the DFB slicer, there is a jitter feedback (JFB) offset compensator. This uses the fact that, as shown in FIG. 4, the phase error is naturally zero, i.e., the middle point of an edge coincides with the zero level, in a state where the PLL is completely locked, while the middle point of the edge departs from the zero level in the case where the offset occurs in the read signal in a state where the PLL is locked. Suppose that the edge is now at the time nT, and the PLL is locked. Assuming the linearity of the read signal in the vicinity of the edge, the offset of this edge can be given by formula (2).

$$\Delta x = Sgn(x(n))\{x(n)+x(n+1)\}/2 \qquad (2)$$

Here, Sgn(x) is a function which gives the sign of x.

As shown in FIG. 9, by forming the feedback loop which integrates the detected offset and subtracts the offset from the read signal, the offset compensation can be performed. Unlike the DFB slicer, the JFB offset compensator does not use the appearance probabilities of "0" and "1," and therefore has a characteristic that a wrong result is hardly given even if the integration time is shortened. The integration time can be determined focusing on reducing the appearance frequency of the edge and the influence of noise, and therefore can be made shorter than in the case of the DFB slicer. Thus, there is a characteristic of a higher adaptability to relatively fast phenomena such as the inter-layer interference in a two-layered disc. Note that, since the edge is used to detect the DC component, it is assumed that the PLL is locked.

Although the JFB offset compensator has the characteristics described above, there is an extremely large drawback of running into a pseudo-lock. The pseudo-lock of the JFB offset compensator refers to a state where a portion which is not a real edge of the read signal is erroneously determined as an edge (which is called a pseudo-edge) as a result of a large offset caused in the read signal due to some factor as shown in FIG. 10, and a feedback of bringing the portion to the zero level is kept held. When the pseudo-lock is occurred, the phase error outputted by the phase detector is meaningless since the pseudo-edge is not the real edge, whereby the PLL cannot be locked with respect to the read signal and it becomes impossible to perform a correct decoding as a result. Triggers of the pseudo-lock include a phenomenon, such as a defect or the inter-layer interference of a two-layered disc, in which the offset of the read signal changes drastically and to a large degree. In essence, the JFB offset compensator has the capability of coping with a phenomenon such as the inter-layer interference of a two-layered disc, while also having the possibility of causing a pseudo-lock due to the phenomena. Due to this reason, the application range of the JFB offset compensator is limited.

SUMMARY OF THE INVENTION

In the case where the linear recording density is high and the resolution of the shortest mark and space is zero, a conventional DFB slicer cannot correctly determine the shortest mark and space in a read signal. Particularly, in the case where a read signal has an asymmetry, the DFB slicer may return a significantly erroneous result, thereby adversely affecting the decoding in some cases.

The characteristic of the read signal disturbed by the inter-layer interference of a dual-layered disc or the like is that there is a local variation of the DC component therein. At this time, the interval in which the DC component varies is as short as about several tens of microseconds in the case of a BD1X. As described above, when the DC component is superimposed on the read signal, the performances of a PLL and a Viterbi decoder are deteriorated. As a means for removing the unwanted DC component from the read signal, there is the DFB slicer as described above. However, the DFB slicer uses the fact that the appearance probabilities of "0" and "1" are equal, whereby a sufficiently long integration time is necessary for removing a statistical fluctuation. Consequently, the DFB slicer cannot cope with the DC component variation due to the inter-layer interference or the like.

As described in Japanese Patent Application Publication No. 2006-4465, the JFB offset compensator uses the fact that the middle point of an edge departs from the zero level in the case where a DC variation occurs in the read signal in a state where the PLL is locked, and obtains a DC level by integrating the middle point level of the edge. In this system, since the edge is used to detect the DC component, it is assumed that the PLL is locked. Thus, it is difficult to compensate for the DC component variation with this system alone. In the case where the amplitude of the superimposed DC component is extremely large, there is a problem that the two points sandwiching the zero level depart from the position of the real edge whereby a wrong result is obtained. The DC component variation due to the inter-layer interference of a dual-layered disc or the like which is a subject of the present invention in particular is a fast phenomenon compared to the operation speed of the DFB slicer as described above, and the amplitude thereof is as much as several tens of percent of the read signal amplitude, whereby it tends to running into a state of detecting pseudo-edges.

Meanwhile, the Viterbi decoder can also cope with the DC component variation of the read signal by causing a target signal level (target level) of the Viterbi decoder to follow adaptively in accordance with the level of the read signal. This technique is described in Japanese Patent Application Publication No. 11-296987. In this technique, the target level used in the Viterbi decoding is caused to follow the read signal, whereby it is necessary to reduce the influence of a fine defect which cannot be detected by a defect detector. Thus, the integration time of an integrator which determines the following speed of the target needs to be long enough so as not to excessively respond to a fine defect. Thus, an adaptive Viterbi decoder is also not suitable for coping with the local DC component variation such as the inter-layer interference.

An object to be achieved by the present invention is to provide a read signal offset compensator and an optical disc drive using this compensator in which local offset variations such as the inter-layer interference of a dual-layered disc can be reduced and the performance degradations of a PLL and a Viterbi decoder can be suppressed even in the case where the linear recording density is high and where the resolution for the shortest mark and space is zero.

In order to achieve the object described above, a JFB offset compensator based on the present invention includes a means for detecting the occurrence or a possibility of the occurrence of a pseudo-lock and a means for resetting the integrator which integrates an offset signal. The integrator is reset when the occurrence or possibility of the occurrence of the pseudo-lock is detected.

A preferred aspect includes a means for limiting the absolute value of an offset signal inputted to the integrator and a means for limiting the absolute value of an offset compensation signal. It is also effective to provide a means for removing a pseudo-edge from a phase comparison and offset detection using a differential signal of the read signal. Further, it is also effective to provide a means for reducing noise of a signal inputted to a phase detector or a means for observing the locked state of a PLL and controlling the operation of the JFB offset compensator according to the state thereof.

The present invention guarantees a sufficient reproduction performance even in the case where the linear recording density is high, the resolution of the shortest mark and space is zero, and the read signal has an asymmetry. Also, the local offset variation such as the inter-layer interference of a dual-layered disc is reduced.

DETAILED DESCRIPTION OF THE PREFERRED EMBODIMENTS

Figure 1:
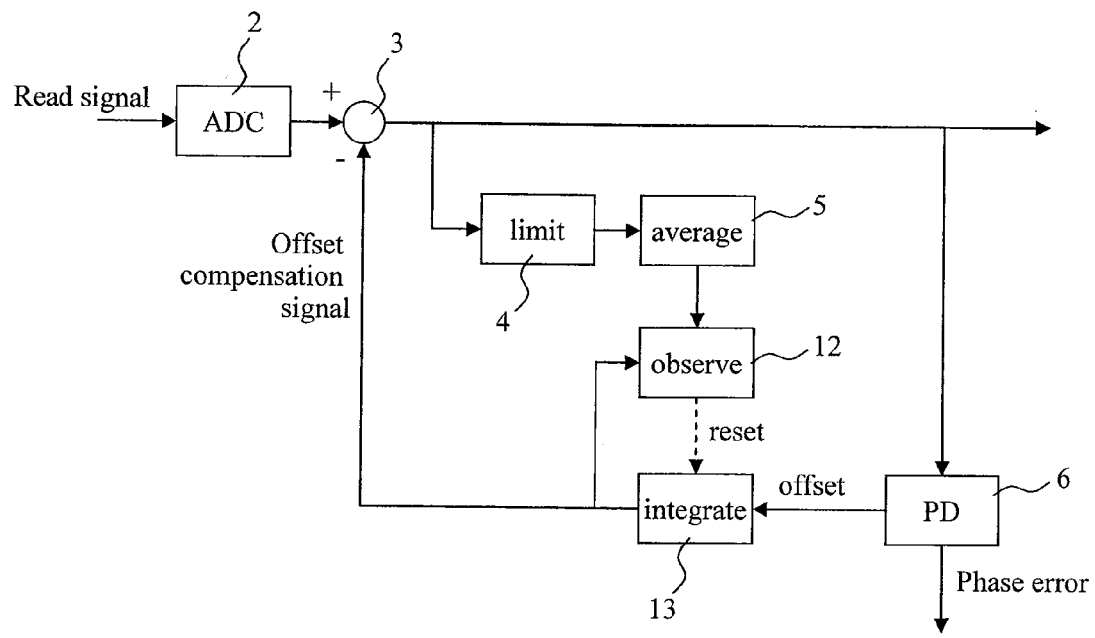
FIG. 1 is a view showing one example of an embodiment of the present invention.
Figure 2:
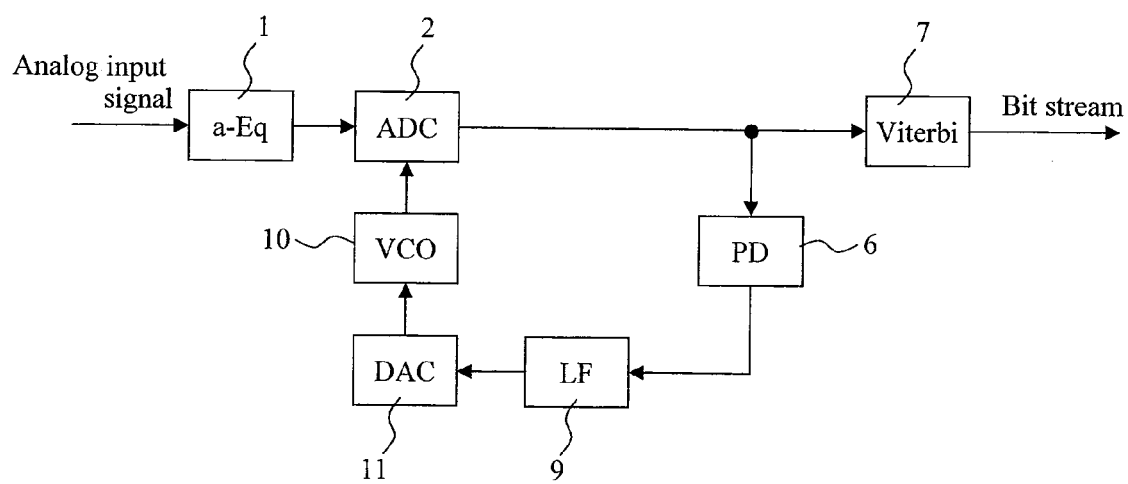
FIG. 2 is a view illustrating an example of a basic optical disc read signal processing system.
Figure 3:
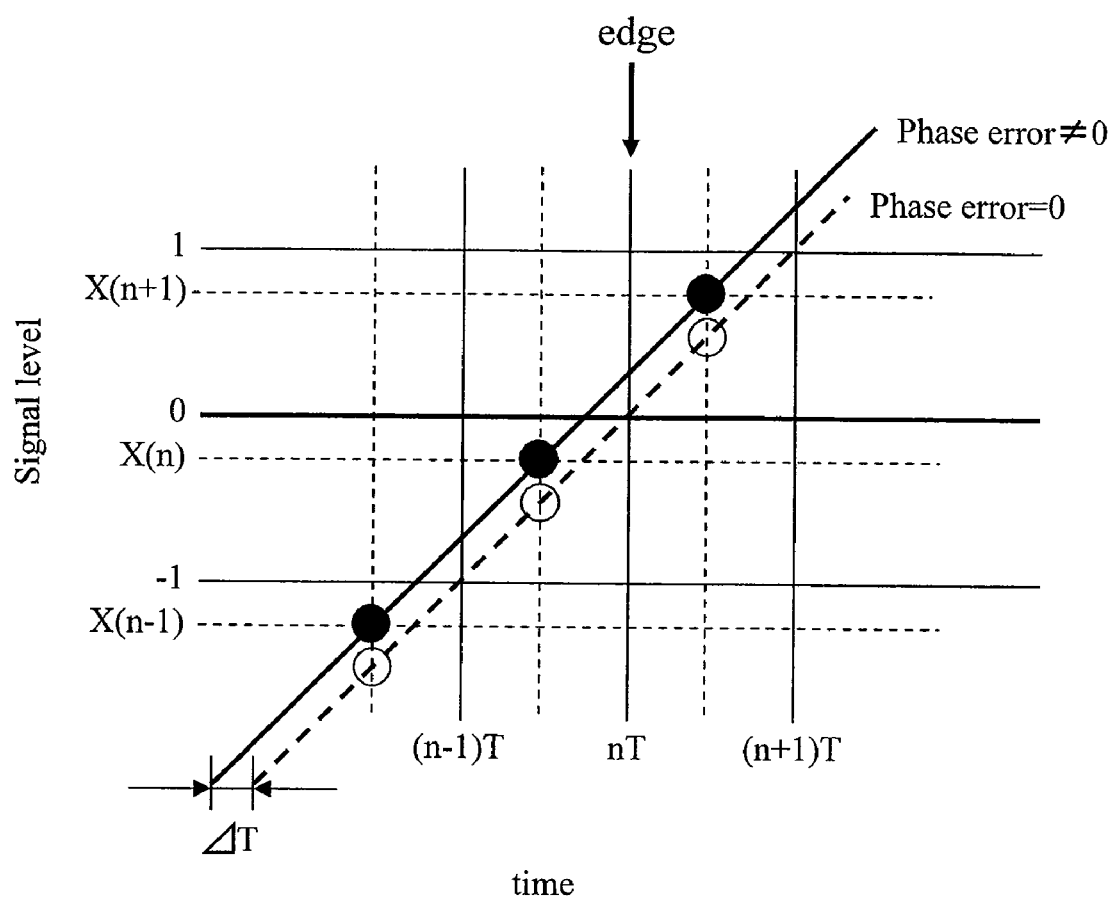
FIG. 3 is a view illustrating the principle of a phase comparison.
Figure 4:
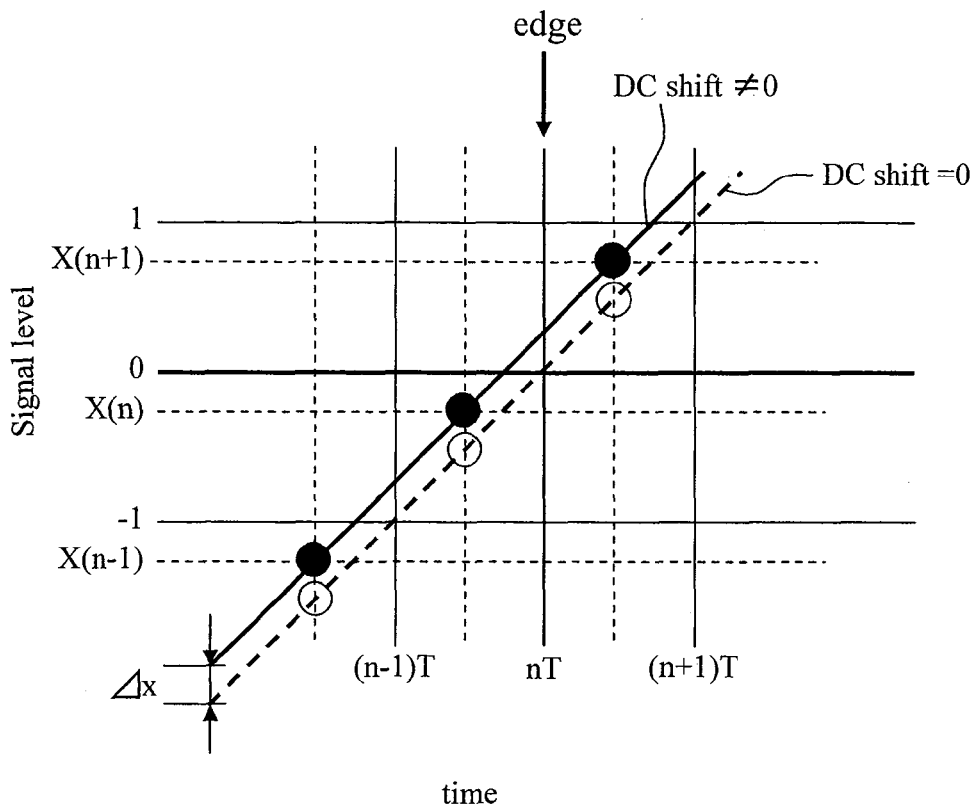
FIG. 4 is a view illustrating the influence of an offset on the phase comparison.
Figure 5:
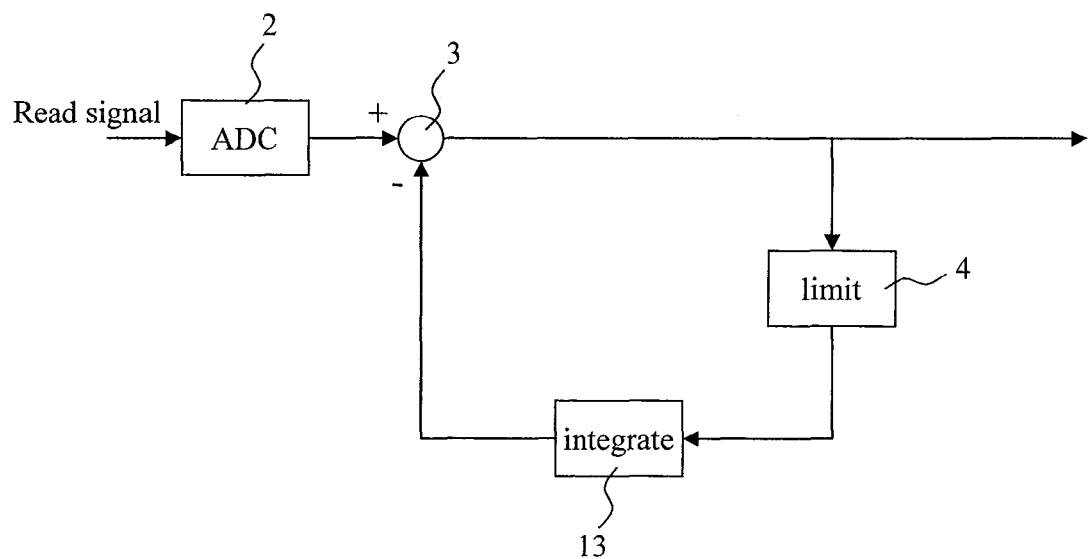
FIG. 5 is a view showing a configuration example of a DFB slicer.
Figure 6:
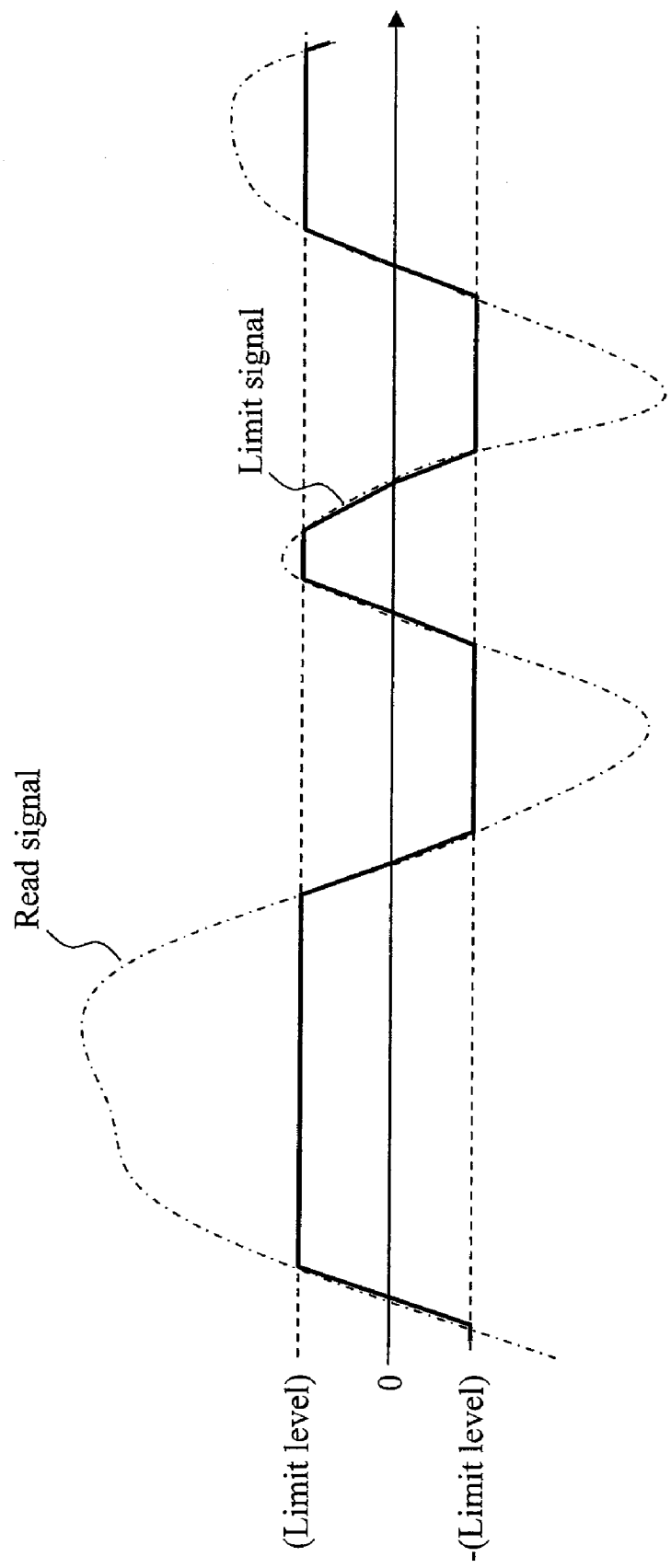
FIG. 6 is a view illustrating a limit signal in the DFB slicer.
Figure 7:
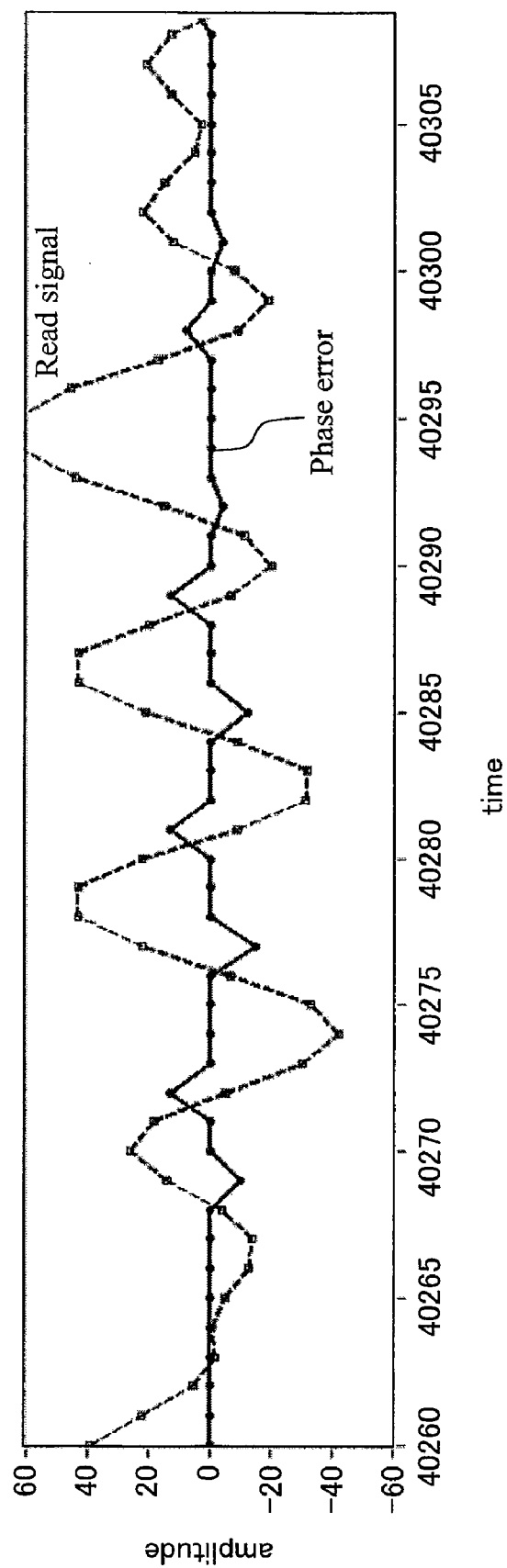
FIG. 7 is a view illustrating an example in which the DFB slicer cannot operate correctly due to the influence of high linear recording density and asymmetry.
Figure 8:
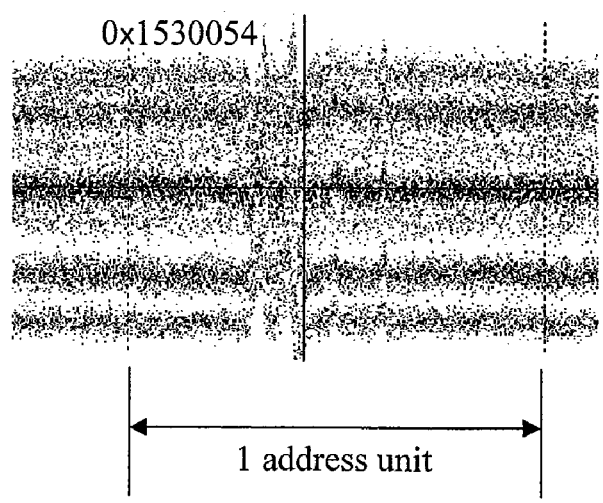
FIG. 8 is a view showing an example of the influence of an inter-layer interference in a two-layered disc on the read signal.
Figure 9:
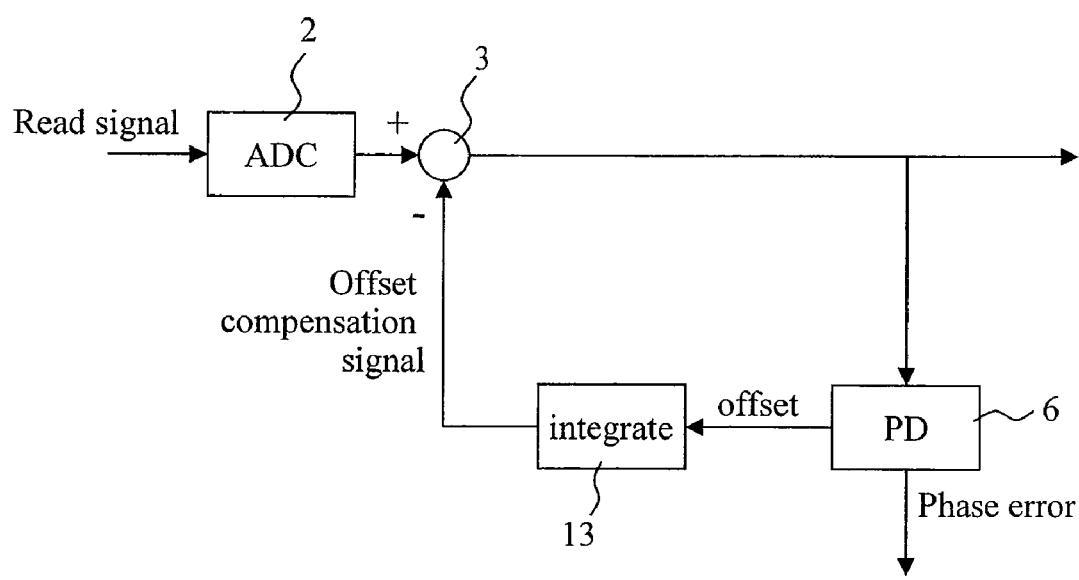
FIG. 9 is a view showing a configuration example of a JFB offset compensator.
Figure 10:
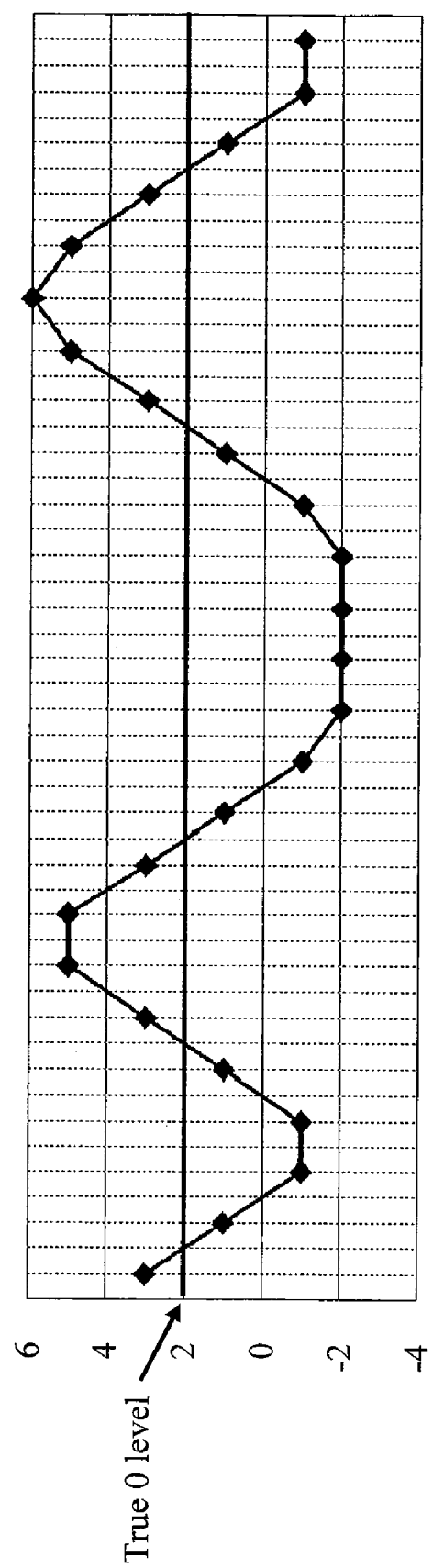
FIG. 10 is a view illustrating a pseudo-lock in the JFB offset compensator.

FIG. 1 shows one example of an offset compensator according to the present invention. FIG. 1 depicts only portions necessary for carrying out the present invention, and other read signal processing systems are omitted for simplification.

In the present invention, a system for removing an offset component from a read signal is based on a JFB offset compensator. Specifically, an analog read signal is converted to a digitized read signal by an AD converter 2, then added to an offset compensation signal in a subtractor 3, and inputted to a phase detector 6. The phase detector 6 outputs a phase error and simultaneously outputs an offset component of each edge as described in the Description of the Related Art. The offset component is smoothed by an integrator 13, whereby the smoothed result becomes the offset compensation signal. So far, it is the same as the conventional JFB offset compensator.

A feature of the present invention is that a means for preventing a pseudo-lock, which is the largest problem in the practice of the JFB offset compensator, is provided. Specifically, a means for detecting the occurrence or a possibility of the occurrence of the pseudo-lock is provided, and the value of the integrator 13 is reset (is set to zero) when these are detected. Thereby, the period of continuing to subtract a wrong offset compensation signal from the read signal can be minimized, whereby an unlocking of the PLL can be prevented.

In the example of FIG. 1, a monitor 12 instructs the reset of the integrator 13. The occurrence or the possibility of the occurrence of the pseudo-lock is detected as follows. The output from the subtractor 3 passes through a limitter 4, and the output from the limitter 4 is inputted to a moving averager 5. The operation of the limitter 4 is as described above in the Description of the Related Art, whereby the output from the moving averager 5 is an offset component of the read signal after a JFB offset compensation. Thus, in the case where the JFB offset compensator operates normally, the output from the moving averager 5 becomes zero or a value with a small absolute value. By contrast, in the case where the JFB offset compensator does not operate normally, the output from the moving averager 5 takes a large significant value. As the operation of the monitor 12, the integrator 13 is reset in the case where the absolute value of the output from the moving averager 5 exceeds a threshold set in advance.

Figure 11:
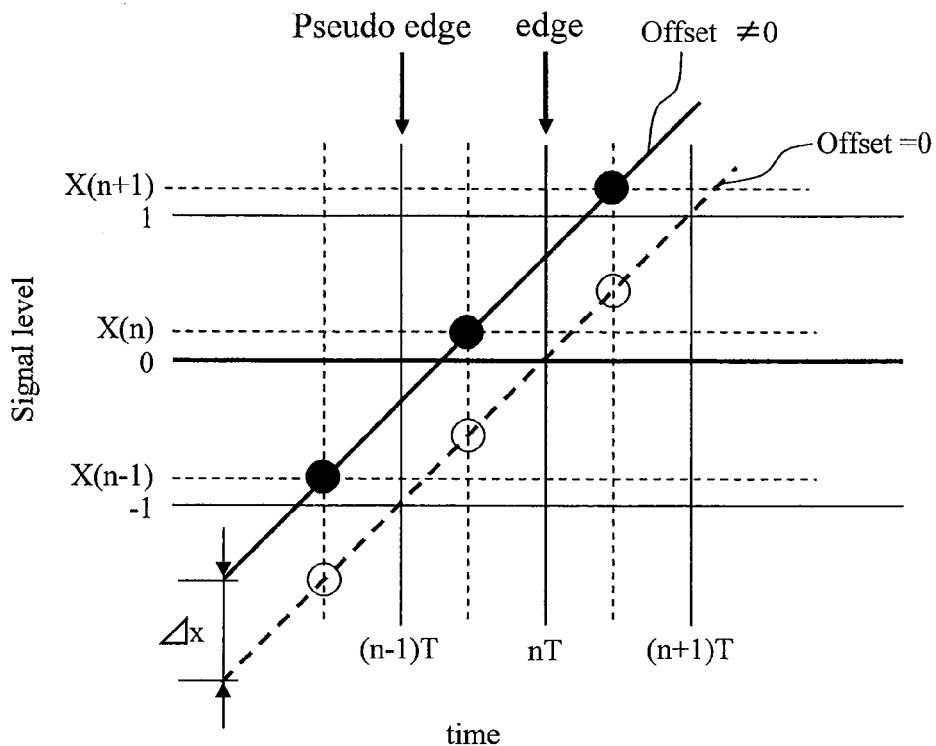
FIG. 11 is a view showing an example in which an offset of an opposite sign is detected due to a large offset.

It is possible to prevent the pseudo-lock with the above operation system. However, there are cases where this does not sufficiently guarantee the operation of the PLL. For example, when a sporadic offset having large amplitude occurs due to a fingerprint or inter-layer interference, an offset detected by the phase detector may be detected with an opposite sign from that of the actual offset. This is shown in FIG. 11.

The edge and sample points in the case where the phases of the channel clock and the edges are completely synchronous and the offset is zero are shown respectively by a dotted line and outline circles. The edge is at the time nT. The values of the two sample points sandwiching the edge at this time are respectively set to x(n+1) and x(n). The read signal in the vicinity of each edge is assumed to be linear. At this time, x(n)=−x(n+1). Meanwhile, a case where an offset of Δx is superimposed in the same portion is shown by a solid line and black circles. Here, ½<Δx<1 is satisfied. Since the size of the offset is significantly large in this manner, the phase detector cannot recognize the real edge and falsely recognizes a zero-crossing at the time (n−1)T as the edge (pseudo-edge). In this case, since the values of x(n−1) and x(n) before the offset is applied are respectively −3/2 and −1/2, the offset detected by the pseudo-edge can be obtained as follows according to the formula (2).

$$\delta = -\{x(n-1)+x(n)\}/2 = -1+\Delta x \quad (3)$$

Since the offset satisfying $1/2 < \Delta x < 1$ is given, the value of the offset obtained by formula (3) is clearly negative. This is clearly a wrong result, which rather works to increase the offset to largely influence the operation of the PLL. In order to prevent this, the monitor also includes a mode of observing the offset compensation signal, i.e., the integrator output, simultaneously with the moving averager output, and resetting the integrator in the case where a situation as described above arises. Specifically, the integrator is reset in the case where both of the integrator output and the moving averager output have significant large values, and the signs of the two differ from each other. Alternatively, in this mode, it is also effective to invert the output value from the integrator instead of resetting the integrator. The effect is the same as the reset in the case of the inversion.

Figure 12:
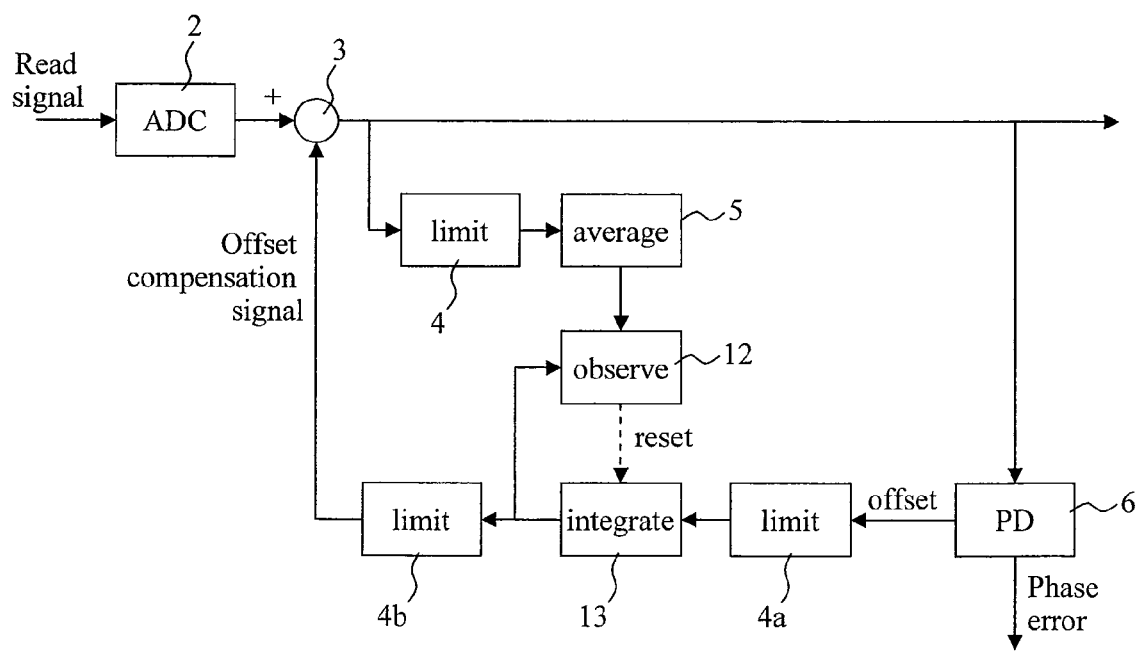
FIG. 12 is a view showing an example of a case where a function of limiting absolute values of an outputted offset signal and an offset compensation signal is added.

In order to prevent a malfunction of the JFB offset compensator caused by a large offset being sporadically superimposed on the read signal, it is effective to provide a limit on the absolute value of the offset signal outputted from the phase detector as well as to provide a limit on the absolute value of the offset compensation signal. FIG. 12 shows an example in which the limits described above are realized on the offset signal outputted from the phase detector 6 and the offset compensation signal outputted from the integrator 13 by inserting limiters 4a and 4b. By limiting the absolute value of the outputted offset signal, the influence of the offset signal with a sporadic large error due to noise can be reduced. By limiting the absolute value of the offset compensation signal, a large offset compensation signal which triggers the pseudo-lock can be prevented from being added to the read signal. Note that providing these limitations causes limitations partly on the performance of the JFB offset compensator. Specifically, by limiting the absolute value of the outputted offset signal, tracking performance in the case of a large offset variation becomes limited. Moreover, by limiting the absolute value of the offset compensation signal, there is a possibility that the offset compensation signal cannot be tracked to the largest displacement in the case of a relative moderate offset variation having large amplitude. Note that, even if only one of the limiters 4a and 4b is provided, it is effective for preventing a malfunction.

Figure 13:
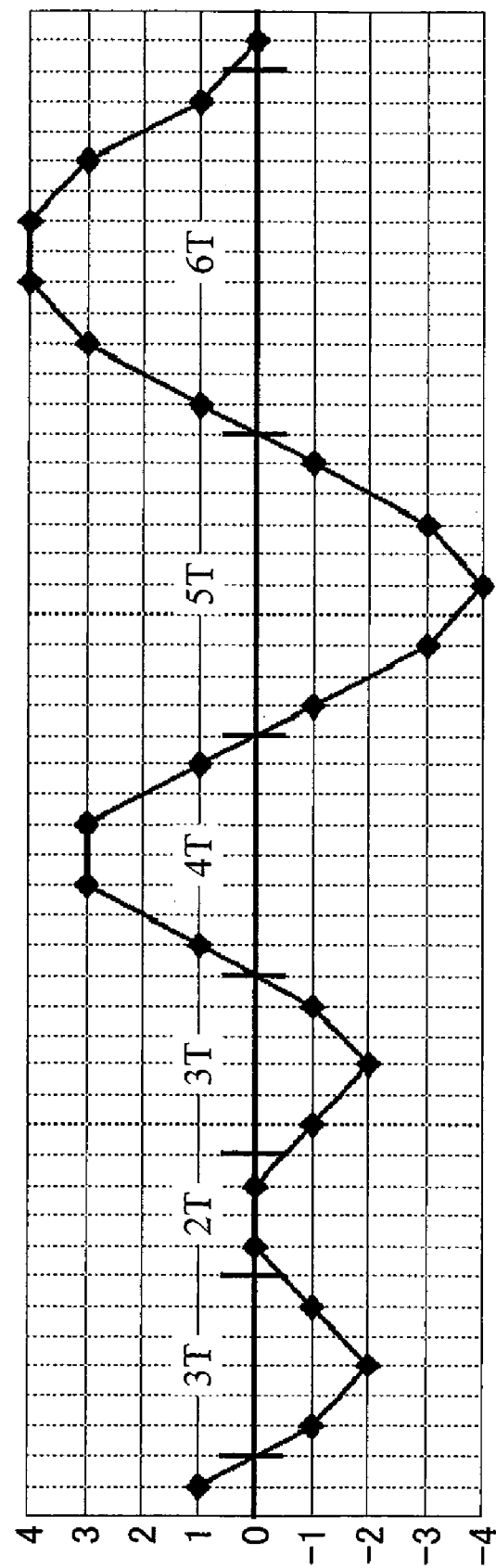
FIG. 13 is a view showing an example of a wave in which an edge cannot be defined since resolution is zero.

In the case where the linear recording density is high to such an extent that the resolution of the shortest mark and space is zero, the edge cannot be defined for a read signal from a pattern relating to the shortest mark and space. An example of a target wave of PR (1, 2, 2, 2, 1) is shown in FIG. 13 as an example of such a wave. In the example in the drawing, the resolution of a 2T signal is zero, whereby the 2T signal coincides with the zero level. Thus, the edge cannot be defined. However, in the actual wave, a pseudo-edge is generated since the inter-layer interference, noise, and other local offsets are superimposed thereon. When the phase comparison and offset detection are performed with such a pseudo-edge, a wrong result is given, whereby the operation of the PLL may become destabilized.

Such an adverse effect from the pseudo-edge needs to be avoided as much as possible. In the present invention, the pseudo-edge can be eliminated by improving the phase detector. The principle will be described using FIG. 14. In the case where the read signal is represented as x(n) according to the notation above, a time difference signal y(n) of the read signal is defined by formula (4).

$$y(n) = x(n) - x(n-1) \quad (4)$$

Figure 14:
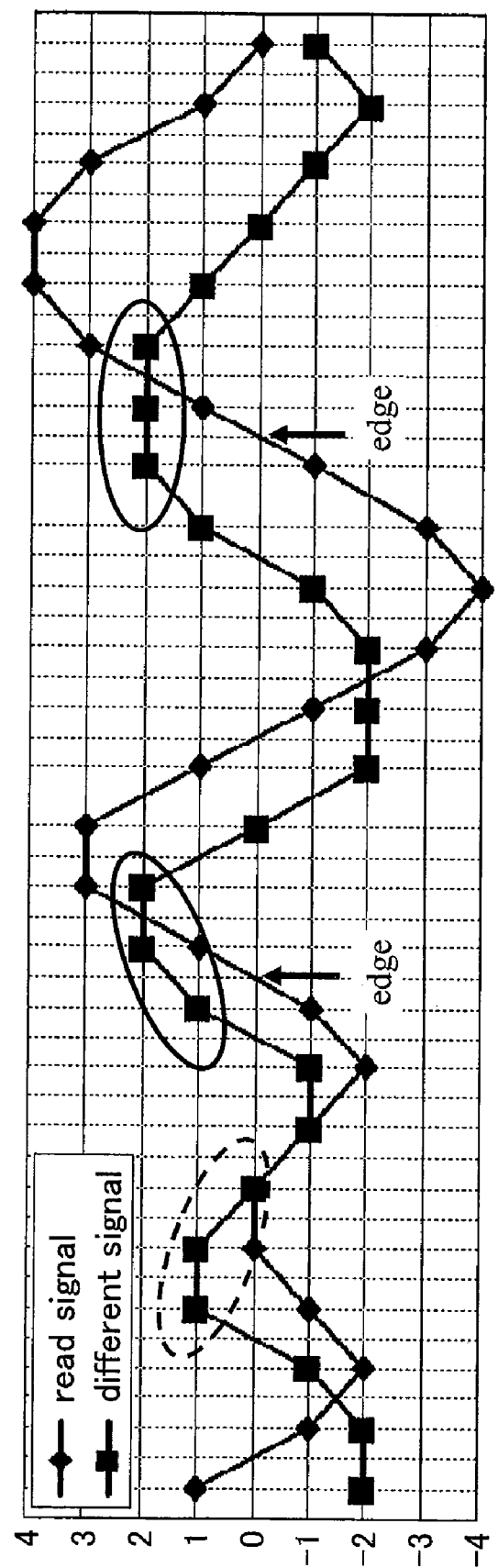
FIG. 14 is a view illustrating the principle of a method of eliminating a pseudo-edge.

In FIG. 14, when looking at a true edge shown by an arrow and two points respectively preceding and following the edge, i.e., four consecutive times (three intervals), it can be seen that the read signal increases or decreases monotonically during this time. In the vicinity of each edge, the absolute value of a differential signal is large since the change rate of the read signal is large. When looking at a portion enclosed by an ellipse of a solid line, the absolute value of the differential signal is unity or greater in three consecutive points. On the other hand, in a portion around the 2T signal, the monotonic increase or decrease of the read signal is up to two consecutive intervals, and the differential signal takes a value of around zero at one of those moments. When looking at a portion enclosed by an ellipse of a dotted line, one point of the differential signal is zero in the vicinity of the pseudo-edge. By using these characteristics, the apparent edge can be eliminated. In other words, only that which satisfies the condition of formula (5) is treated as the edge.

$$x(n)x(n-1)<0 \wedge |y(n+1)|>a \wedge |y(n)|>a \wedge |y(n-1)|>a \wedge sgn(y(n+1))=sgn(y(n))=sgn(y(n-1)) \quad (5)$$

Figure 15:
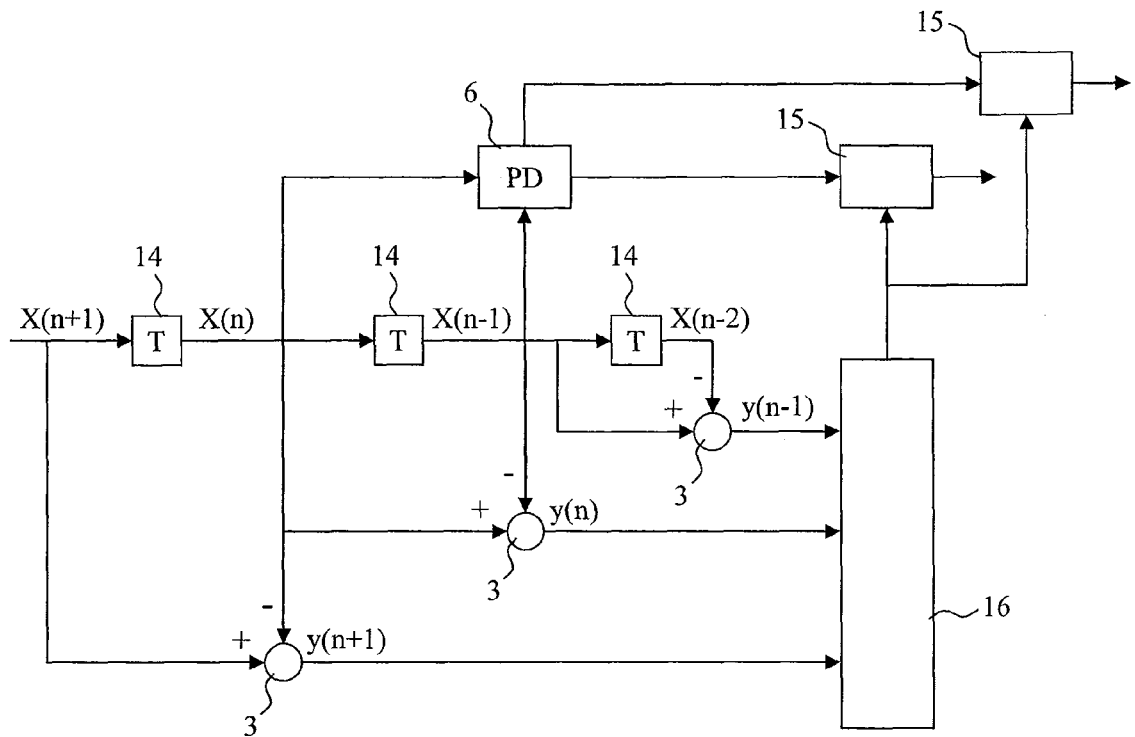
FIG. 15 is a view showing a configuration example of a phase detector which can eliminate the pseudo-edge.

Herein, "a" is a positive threshold whose value is designated in advance. FIG. 15 shows a configuration example of the phase detector having the above determination function. A delayer 14 delays the signal by one channel clock. By using three delayers, the read signals of four times from x(n−2) to x(n+1) exist inside this circuit. Differential signals y(n−1) to y(n+1) of the three times are obtained therefrom, and at the same time, x(n) and x(n−1) are inputted to the phase detector. The phase detector outputs a phase error and an offset in the case of determining the input as the edge according to the existing definition. The phase error and the offset thus outputted are respectively inputted to an output switch 15.

Meanwhile, the differential signals y(n−1), y(n), y(n+1) obtained as described above are inputted to a determinator 16. The determinator 16 evaluates the sign and absolute value of each differential signal, and determines whether or not formula (6) is satisfied.

$$|y(n+1)|>a \wedge |y(n)|>a \wedge |y(n-1)|>a \wedge sgn(y(n+1))=sgn(y(n))=sgn(y(n-1)) \quad (6)$$

The determination results are inputted to the respective output switches 15, and each output switch 15 outputs the phase error or the offset in the case where the determination result is true. Thus, the influence of the pseudo-edge caused by the resolution of the shortest mark and space being zero or extremely small at the time of phase error or offset detection can be eliminated.

Figure 16:
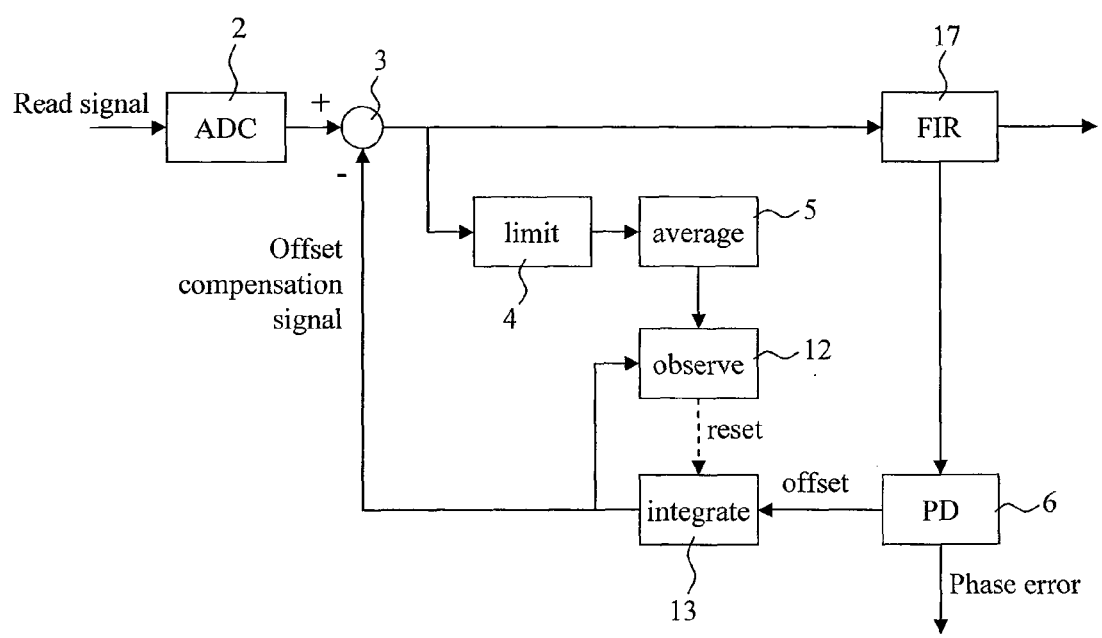
FIG. 16 is a configuration example in which an FIR equalizer is inserted before the phase detector.

As described above, in the JFB offset compensator, the integration time can be set shorter than in the DFB slicer in principle. Thus, the effect can also be exhibited for a fast phenomenon. However, in the case where noise is large, setting a short integration time causes the noise of the offset compensation signal to increase, whereby the accuracy of the offset compensation and the phase comparison are decreased. FIG. 16 is an example in which the influence of such noise is reduced by inserting an FIR filter 17 as a low-pass filter before the phase detector 6. The number of taps of the FIR filter 17 is 15, and coefficients are shown in Table 1.

TABLE 1

| Tap No | -7 | -6 | -5 | -4 | -3 | -2 | -1 | 0 | 1 | 2 | 3 | 4 | 5 | 6 | 7 |
|---|---|---|---|---|---|---|---|---|---|---|---|---|---|---|---|
| value | -0.060 | 0.048 | 0.075 | -0.024 | -0.119 | 0.024 | 0.320 | 0.470 | 0.320 | 0.024 | -0.119 | -0.024 | 0.075 | 0.048 | -0.060 |

Figure 17:
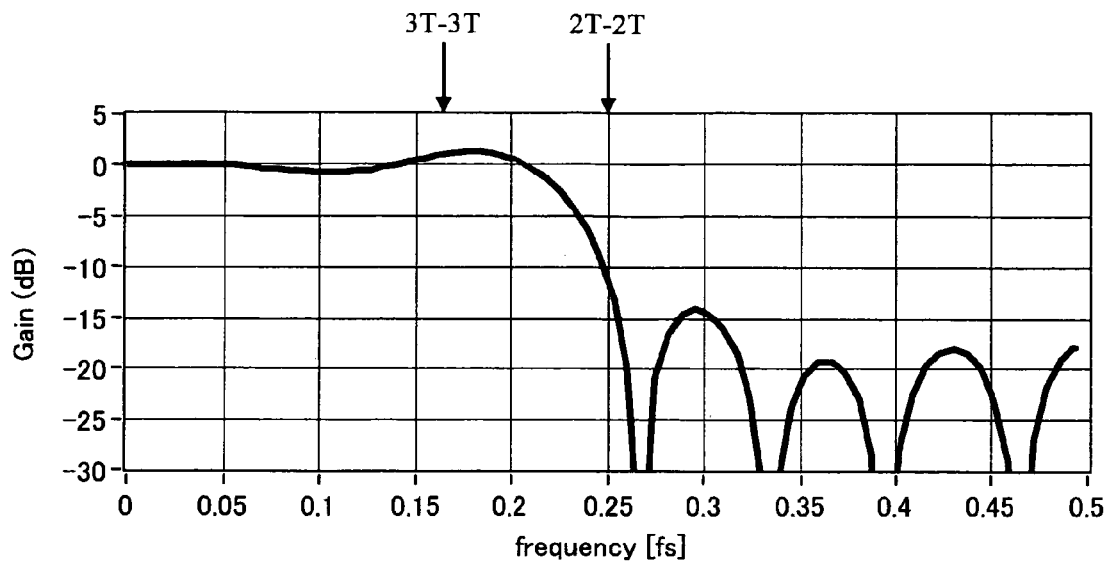
FIG. 17 is an example of an amplitude-frequency characteristic of the FIR equalizer.
Figure 18:
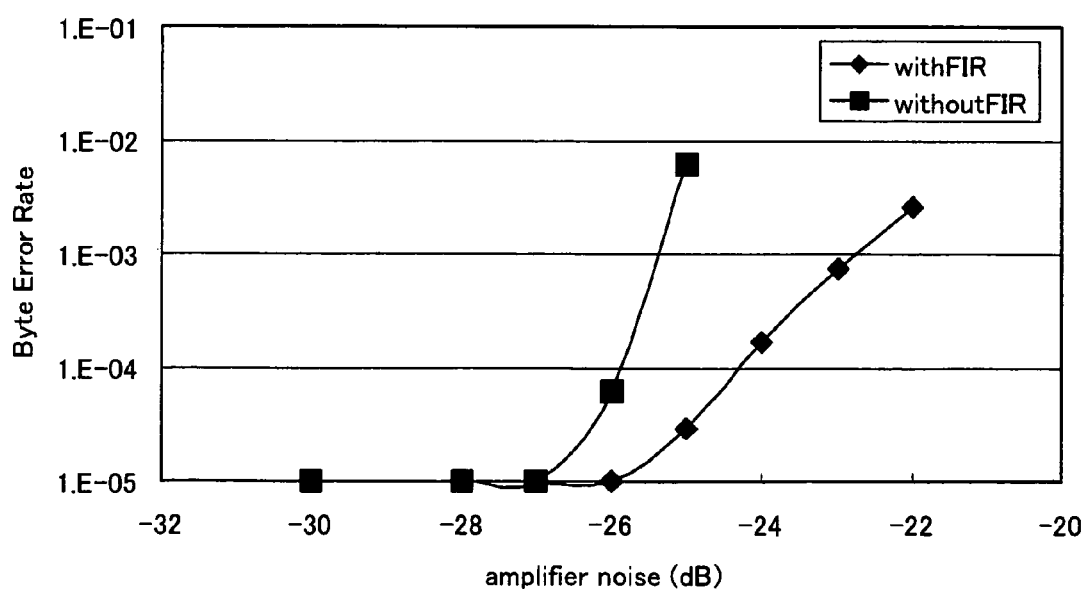
FIG. 18 is a view showing the difference in reproduction performance by the presence or absence of an FIR filter.

The amplitude-frequency characteristic of the FIR filter at this time is shown in FIG. 17. As can be seen from FIG. 17, after up to a 3T signal passes through, there is an attenuation characteristic in a frequency range higher than a 2T signal. Thereby, noise in a frequency range higher than the read signal can be suppressed. FIG. 18 shows the difference in reproduction performance by the presence or absence of an FIR filter. The horizontal axis shows an amplifier noise represented by relative amplitude with respect to envelope amplitude of the read signal. The vertical axis shows a byte error rate. The error rate is clearly lower in the case where the FIR filter is inserted. Note that, in FIG. 16, the FIR filter 17 may be inserted immediately after the subtractor 3, and a signal having passed through the FIR filter 17 may be inputted to the limitter 4 as well as to the phase detector 6.

Figure 19:
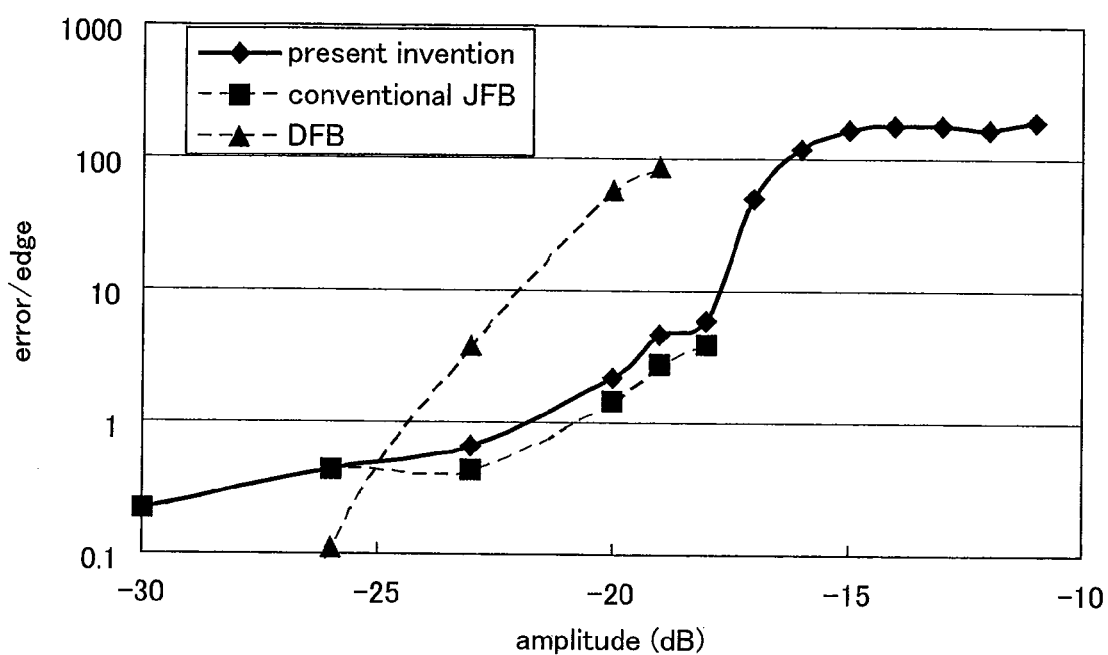
FIG. 19 is a view showing a result of simulation for confirming the effectiveness of the present invention.

FIG. 19 is an example in which the effect of the present invention is checked by simulation. As a test signal, a signal in which a rectangular wave signal is superimposed on a composed wave created from a bit string pattern generated in accordance with an ideal optical step response of the BD optical system and the code rule of the BD has been used. This process can easily be understood by those skilled in the art, and therefore a detailed description thereof will be omitted. The length of the wave was 100,000 T. The horizontal axis of FIG. 19 shows the rectangular wave amplitude represented by the relative amplitude with respect to the envelope amplitude of the read signal. The vertical axis shows the number of bit errors per one edge of the rectangular wave. The results of the DFB slicer and the conventional JFB offset compensator are also shown for comparison. With the DFB slicer, the number of errors rapidly increases along with the increase in the rectangular wave amplitude, and the error cannot be measured any more when the rectangular wave amplitude is larger than -18 db and the PLL cannot hold the locked state. With the conventional JFB offset compensator, the increase rate of error with respect to the rectangular wave amplitude is smaller than the DFB slicer, and the absolute value in a region where the rectangular wave amplitude is large is also smaller by approximately one digit. However, in a region where the rectangular wave amplitude is -17 db or larger, the error was not be measured due to the occurrence of the pseudo-lock. The JFB offset compensator of the present invention showed an equivalent result as the conventional JFB offset compensator in a rectangular wave amplitude of -18 db and less. However, the pseudo-lock did not occur even in the region where the rectangular wave amplitude is -17 db or larger, whereby the effectiveness of the present invention has been confirmed.

Figure 20:
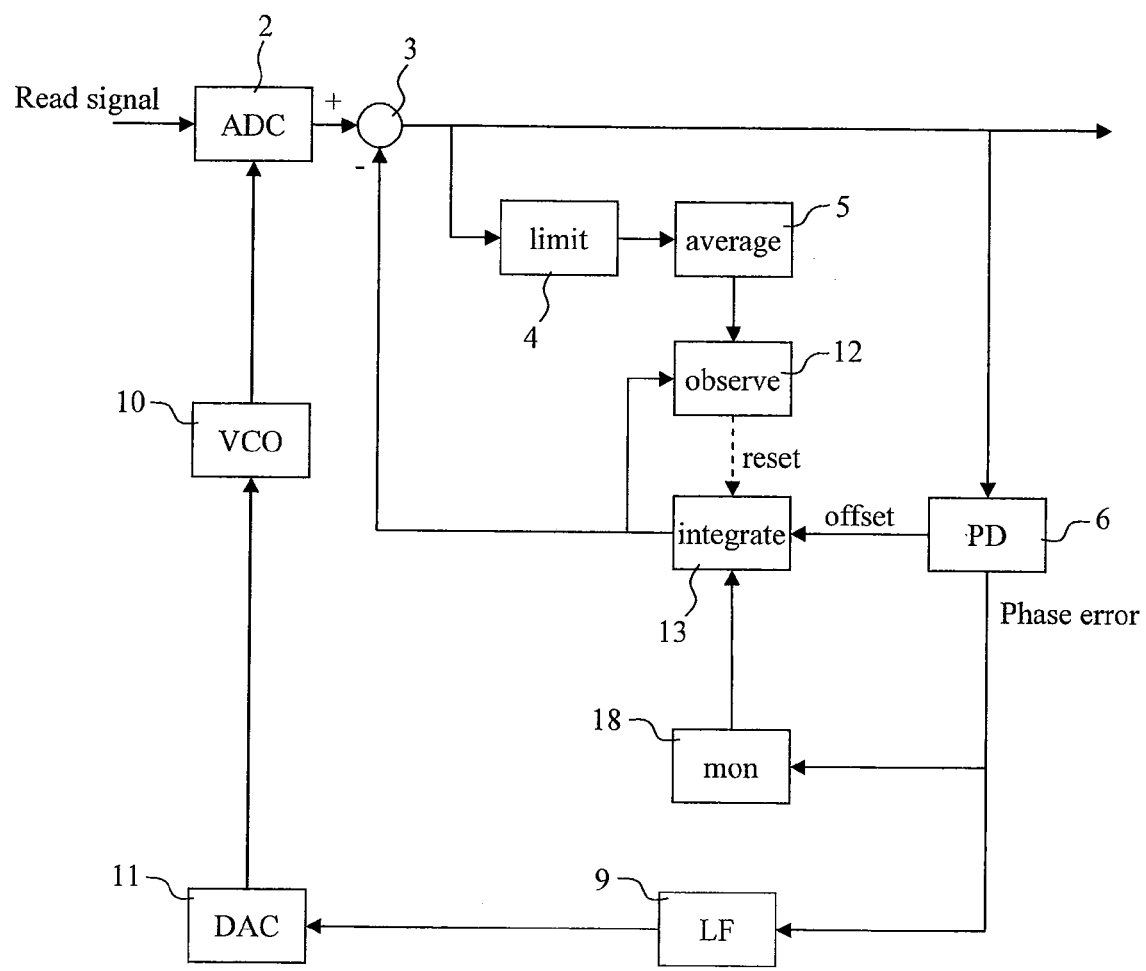
FIG. 20 is a view showing a configuration example of a case where the operation of the JFB offset compensator is controlled according to the operation state of a PLL.

In the JFB offset compensator, a normal operation is not guaranteed unless the PLL is locked. FIG. 20 is an example of a configuration which can control the operation of the JFB offset compensator while monitoring the operation state of the PLL in order to cope with this problem. The configuration and operation are approximately the same as FIG. 1. The difference is that a lock monitor 18 is provided which monitors the operation of the PLL. A phase error outputted from the phase detector 6 is inputted to the lock monitor 18. The lock monitor 18 evaluates a time averaged value of the effective value of the phase error, and determines that the PLL is not locked in the case where the obtained value is larger than a value designated in advance. In such a case, the lock monitor 18 instructs the integrator 13 to bring the value of the integrator 13 of the JFB offset compensator to zero. Then when it is determined that the PLL is locked, the operation of the integrator 13 is made effective. Thereby, a false operation of the JFB offset compensator can be prevented in a period when the PLL has not yet been locked in response to the clock of the read signal, such as immediately after a shift from an unrecorded region to a recorded region.

Figure 21:
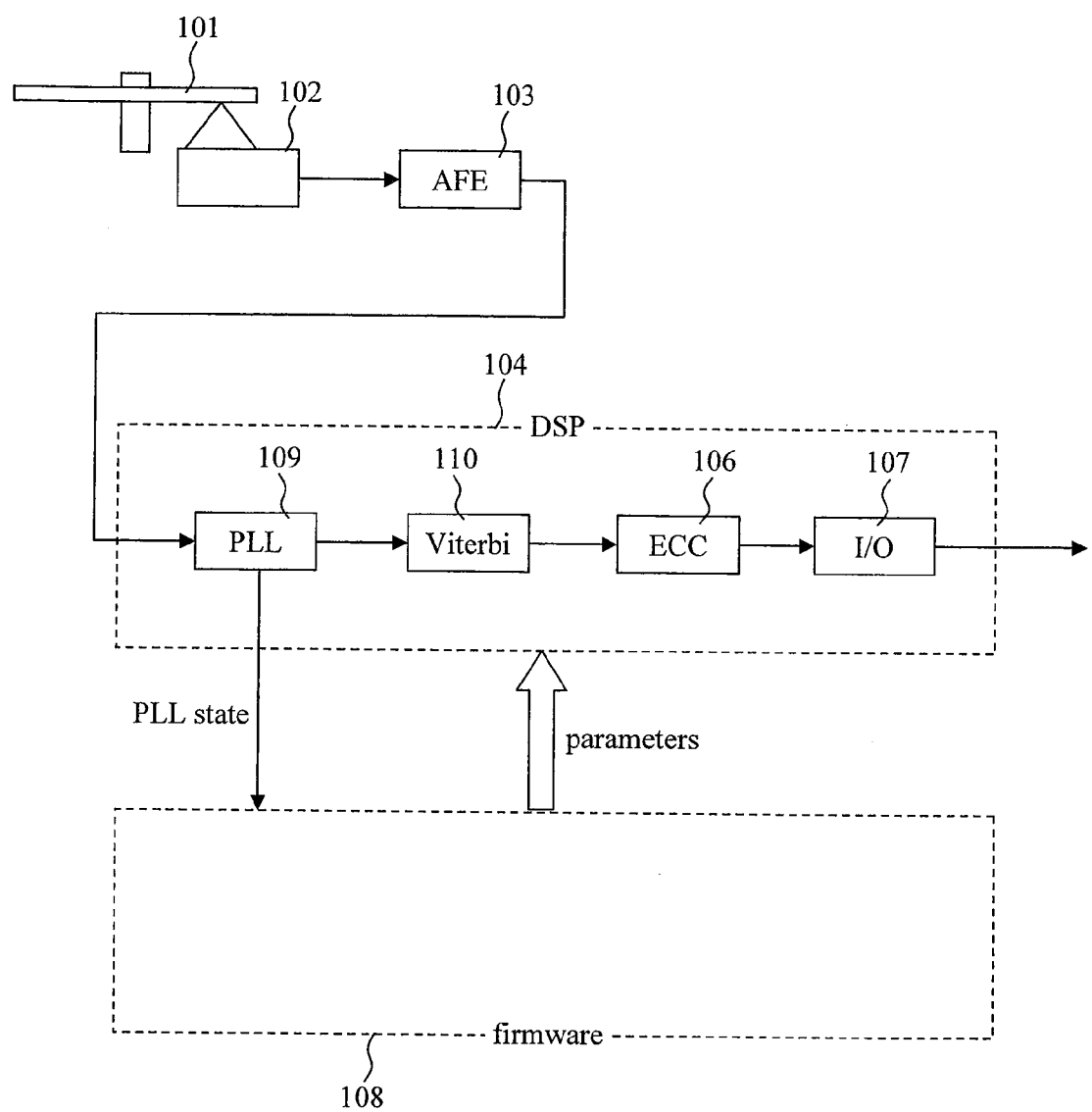
FIG. 21 is a configuration example of an optical disc drive to which the present invention is applied.

FIG. 21 shows a schematic view of the configuration of an optical disc drive to which the present invention is applied. In FIG. 20, only portions to which explanation is required in relation to the present invention are shown, and other portions are omitted in the drawing. In the same manner, descriptions on the details of portions which can easily be understood by those skilled in the art are also omitted. Note that this embodiment has a configuration of using two types of LSIs: an analog front end (AFE) IC in which a large portion of analog circuits of the optical disc drive are integrated and a digital signal processor (DSP) in which a large portion of digital circuits are integrated. The configuration in which the LSIs are combined in this manner is common in optical disc drives, and an analog equalizer is generally integrated within the AFE-IC in this case.

First, an outline of the operation will be described. Information recorded on an optical disc 101 is optically read out and converted to an electric signal (read signal) by a pickup 102. The read signal is amplified to have certain amplitude by an AFE-IC 103 as well as equalized by a built-in analog equalizer, and then inputted to a PLL block 109 in a DSP 104. The PLL block includes the PLL and related DFB slicer or JFB offset compensator, i.e., involves FIGS. 5 and 1, 13, 17, or 21 of the embodiment described above. After a channel clock is synchronized with the clock of the read signal in the PLL block 109, the read signal is decoded to a bit string by a Viterbi decoder 110. The decoded bit string is subjected to an error correction process on a RUB basis by an ECC decoder 106 to obtain user data. The user data is outputted outside the drive via an interface circuit 107.

As described above, in the PLL block 109, signals showing the locked state of the PLL exist, and these are generally used to control the operation of the JFB offset compensator. In this embodiment, the signals can be referenced from firmware 108. Thereby, the firmware 108 can be aware of the problem occurred during reproduction. In this embodiment, in the case where a read error occurs while a block is being reproduced, whether or not the PLL has been brought to an unlocked state during the reproduction of the block is examined by monitoring the PLL locked state signals. When unlocked, the firmware 108 sets a PLL parameter in the DSP such that a time constant of the PLL can temporarily increase or decrease to make an attempt to avoid the unlocked state.

INDUSTRIAL APPLICABILITY

According to the present invention, the reproduction performance of an optical disc drive can be improved particularly for reproducing a disc having multiple layers and high linear recording density.

EXPLANATION OF REFERENCE NUMERALS

1: Analog equalizer,
2: AD converter,
3: Subtractor,
4: Limitter,
5: Moving averager,
6: Phase detector,
7: Viterbi decoder,
9: Loop filter,
10: VCO,
11: DA converter,
12: Monitor,
13: Integrator,
14: Delayer,
15: Output switch,
16: Determinator,
17: FIR filter,
18: Lock monitor,
101: Disc,
102: Pickup,
103: AFE-IC,
104: DSP,
106: ECC decoder,
107: Interface circuit,
108: Firmware,
109: PLL block,
110: Viterbi decoder.

What is claimed is:

1. An offset compensator comprising:
a means for performing time discretization of a read signal to a digitized read signal;
a means for subtracting an offset compensation signal from the digitized read signal to create an output signal;
a first offset detection means for detecting an offset of the output signal;
a second offset detection means for detecting the offset of the output signal with a different method from the first offset detection means;
a means for smoothing the offset, detected by the first offset detection means, in a time region to create the offset compensation signal; and
a determination means for determining a possibility of a generation of a pseudo-lock, by using the offset compensation signal and an output from the second offset detection means,
wherein the determination means performs any one of setting the offset compensation signal to zero and inverting a value of the offset compensation signal when determining that there is a possibility of the generation of the pseudo-lock.

2. The offset compensator according to claim 1, wherein the second offset detection means includes a limiter and a means for calculate a moving average of output from the limitter.

3. The offset compensator according to claim 1, further comprising a means for limiting an absolute value of an offset signal detected by the first offset detection means.

4. The offset compensator according to claim 1, further comprising a means for limiting an absolute value of the offset compensation signal.

5. The offset compensator according to claim 1, further comprising a means for determining a pseudo-edge generated due to a high linear recording density, by using a characteristic of monotonic increase or monotonic decrease of the read signal and a differential signal thereof in a vicinity of an edge.

6. The offset compensator according to claim 1, further comprising a low-pass filter before the first offset detection means.

7. The offset compensator according to claim 1, further comprising a means for controlling an operation of an offset compensation circuit according to an operation state of a PLL.

8. An optical disc drive comprising:
a pickup which optically reads out information recorded on an optical disc and converts the information to a read signal; and
a read signal processing circuit which processes the read signal, wherein
the read signal processing circuit includes:
a PLL block;
a Viterbi decoder; and
an ECC decoder, and
the PLL block includes an offset compensator and a PLL, the offset compensator including:
a means for performing time discretization of a read signal to a digitized read signal;
a means for subtracting an offset compensation signal from the digitized read signal to create an output signal;
a first offset detection means for detecting an offset of the output signal;
a second offset detection means for detecting the offset of the output signal with a different method from the first offset detection means;
a means for smoothing the offset, detected by the first offset detection means, in a time region to create the offset compensation signal; and
a determination means for determining a possibility of a generation of a pseudo-lock using the offset compensation signal and an output from the second offset detection means, and
the determination means performing any one of setting the offset compensation signal to zero and inverting a value of the offset compensation signal when determining that there is a possibility of the generation of the pseudo-lock.

* * * * *